(12) United States Patent
Nagaya et al.

(10) Patent No.: US 6,320,359 B1
(45) Date of Patent: Nov. 20, 2001

(54) DC-DC CONVERTER AND CONTROLLER FOR DETECTING A MALFUNCTION THEREIN

(75) Inventors: Yoshihiro Nagaya; Koichi Inatomi; Toshiyuki Matsuyama, all of Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/671,646

(22) Filed: Sep. 28, 2000

(30) Foreign Application Priority Data

Feb. 24, 2000 (JP) ................................................. 12-047680

(51) Int. Cl.[7] ...................................................... G05F 1/613
(52) U.S. Cl. ........................... 323/224; 323/282; 323/283; 323/287; 323/270
(58) Field of Search .................................... 323/224, 282, 323/283, 287, 270

(56) References Cited

U.S. PATENT DOCUMENTS 5,705,919 * 1/1998 Wilcox .................................. 323/282
5,731,694 * 3/1998 Wilcox et al. ........................ 323/287
5,994,885 * 11/1999 Wilcox et al. ........................ 323/285

FOREIGN PATENT DOCUMENTS 7-222438   8/1995  (JP) .

* cited by examiner

Primary Examiner—Shawn Riley
(74) Attorney, Agent, or Firm—Arent Fox Kintner Plotkin & Kahn PLLC

(57) ABSTRACT

A DC-DC converter includes a main switching device and a synchronous switching connected in series between a power supply and a ground, and a drive control circuit for supplying a first drive signal to the main switching device and a second drive signal to the synchronous switching device to alternately activate and deactivate the main switching device and the synchronous switching device. A detection circuit is connected to the synchronous switching device for detecting a malfunction of the synchronous switching device, such as a short-circuit, and generates a detection signal when a malfunction is detected. A protection circuit is connected to the detection circuit and the drive control circuit and inhibits the first and second drive signals in response to the detection signal. The drive control circuit, the detection circuit and the protection circuit are all formed on a single semiconductor substrate.

19 Claims, 7 Drawing Sheets

DC-DC CONVERTER AND CONTROLLER FOR DETECTING A MALFUNCTION THEREIN

BACKGROUND OF THE INVENTION

The present invention relates to a DC-DC converter, and more particularly, to a synchronous rectifier type DC-DC converter used as a power source for electronic devices and a controller for such DC-DC converter.

The recent increase in the operational frequency speed of a CPU for electronic devices has resulted in an increase in the power source current. This, in turn, has increased the power of a synchronous rectifier type DC-DC converter, which is used as a power source of the CPU. In a DC-DC converter, a main switching device and a synchronous switching device, which are connected in series, are alternately activated and deactivated to supply a constant voltage to a load. When these switching devices are short-circuited, an amount of current greater than that during normal operation may flow toward other externally connected devices and damage the externally connected devices. Accordingly, it is required that the externally connected devices be protected.

FIG. 1 is a schematic circuit diagram of a prior art DC-DC converter 1. The DC-DC converter 1 includes a controller 2, which is formed as a circuit on a single semiconductor substrate, and a plurality of externally connected devices, that is, a main switching device 3, a synchronous switching device 4, a choke coil 5, a flyback diode 6, and a smoothing capacitor 7.

The controller 2 provides the main switching device 3 with a first drive signal SG1. The switching device 3 is an enhancement n-channel MOS transistor, which gate is provided with the drive signal SG1. The drain of the switching device 3 is supplied with power source voltage Vi from a battery E. The source of the switching device 3 is connected to the synchronous switching device 4.

The synchronous switching device 4 is an enhancement n-channel MOS transistor having a drain connected to the source of the main switching device 3. The gate of the synchronous switching device 4 is provided with a second drive signal SG2 from the controller 2 and the source is connected to the ground GND.

The source of the main switching device 3 is connected to an output terminal To via the choke coil 5, and also to the cathode of the flyback diode 6, which anode is connected to the ground GND.

The output terminal To is connected to the ground GND via the smoothing capacitor 7 and to a load (not shown), such as a CPU. The output terminal To provides the load with an output voltage Vo and returns the output voltage Vo to the controller 2.

With reference to FIG. 2, the controller 2 provides the switching devices 3, 4 respectively with first and second drive signals SG1, SG2, which are essentially complementary signals. This alternately activates and deactivates the main switching device 3 and the synchronous switching device 4. The switching of the main switching device 3 fluctuates the voltage VS at a node N1 between the two switching devices 3, 4 in a pulse-like manner. The voltage VS is smoothed by the choke coil 5 and the smoothing capacitor 7 to generate a predetermined output voltage Vo.

The controller 2 compares the returned output voltage Vo with a reference voltage to vary the duty ratio of the first and second drive signals SG1, SG2. This enables the DC-DC converter 1 to substantially match the output voltage Vo with a set voltage.

When the main switching device 3 is deactivated, the synchronous switching device 4 is activated. This maintains the voltage drop of the voltage VS, which is caused by the forward voltage VD of the flyback diode 6, at substantially zero volts. Thus, the synchronous switching device 4 suppresses power consumption by the flyback diode 6 and prevents the smoothing efficiency from being decreased. This improves the efficiency of the DC-DC converter 1. Thus, the synchronous rectifier DC-DC converter 1 is used in equipment that requires a large output current.

However, when a short-circuit occurs between the drain and the source of the main switching device 3, the output voltage Vo becomes higher than the set voltage. Since such short-circuit results in an abnormal output, a protection measure has been provided in the prior art.

When a short-circuit occurs between the gate and source of the synchronous switching device 4, the switching device 4 is deactivated. Thus, the DC-DC converter 1 operates as a normal DC-DC converter, which does not have the synchronous rectifying function, and the output voltage is almost the same as that during a normal state. However, the rating of each of the devices 3–7 is set as for a synchronous rectifier type DC-DC converter. Thus, the load applied to the main switching device 3 and the flyback diode 6 increases, which may, in turn, produce heat and damage the devices. Such problem is especially prominent in a DC-DC converter having a large output current.

SUMMARY OF THE INVENTION

It is an object of the present invention to provide a DC-DC converter and a controller for a DC-DC converter that protects devices when an abnormality occurs in a synchronous switching device.

To achieve the above object, the present invention provides a controller for controlling a DC-DC converter. The DC-DC converter includes a main switching device and a synchronous switching device, which are series-connected, and a flyback diode and a smoothing circuit, which are connected to a node between the switching devices. The controller includes a drive control circuit for alternately activating and deactivating the main switching device and the synchronous switching device by supplying the main switching device with a first drive signal and the synchronous switching device with a second drive signal. A signal control circuit detects malfunction of the synchronous switching device and upon detection of a malfunction, controls the drive control circuit to inhibit the supply of the first and second drive signals.

Another aspect of the present invention provides a controller for a DC-DC converter. The DC-DC converter includes a main switching device and a synchronous switching connected in series between a power supply and a ground. The controller includes a drive control circuit for supplying a first drive signal to the main switching device and a second drive signal to the synchronous switching device to alternately activate and deactivate the main switching device and the synchronous switching device. A detection circuit is connected to the synchronous switching device for detecting a malfunction thereof and generating a detection signal. A protection circuit, connected to the detection circuit and the drive control circuit, inhibits the first and second drive signals in response to the detection signal. The controller is formed on a single semiconductor substrate.

A further aspect of the present invention provides a DC-DC converter including a main switching device, a synchronous switching device connected in series with the main switching device, a flyback diode connected to a node between the two switching devices, a smoothing circuit connected to a node between the two switching devices, and a controller connected to the main switching device and the synchronous switching device. The controller includes a drive control circuit for alternately activating and deactivating the main switching device and the synchronous switching device by supplying the main switching device with a first drive signal and the synchronous switching device with a second drive signal. A signal control circuit detects a malfunction of the synchronous switching device and upon detection of the malfunction, controls the drive control circuit to inhibit the supply of the first and second drive signals.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
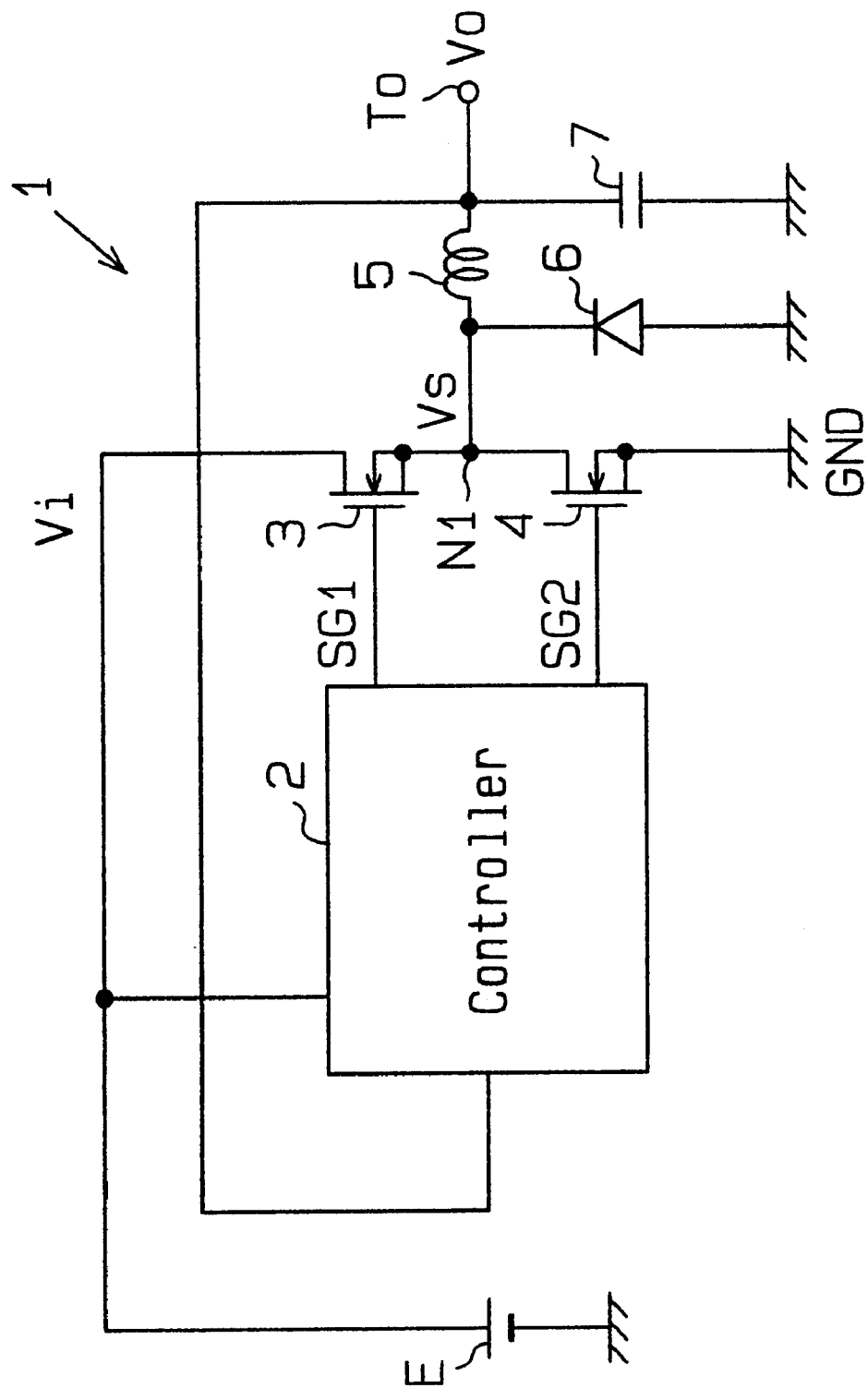
FIG. 1 is a schematic circuit diagram of a prior art DC-DC converter.
Figure 2:
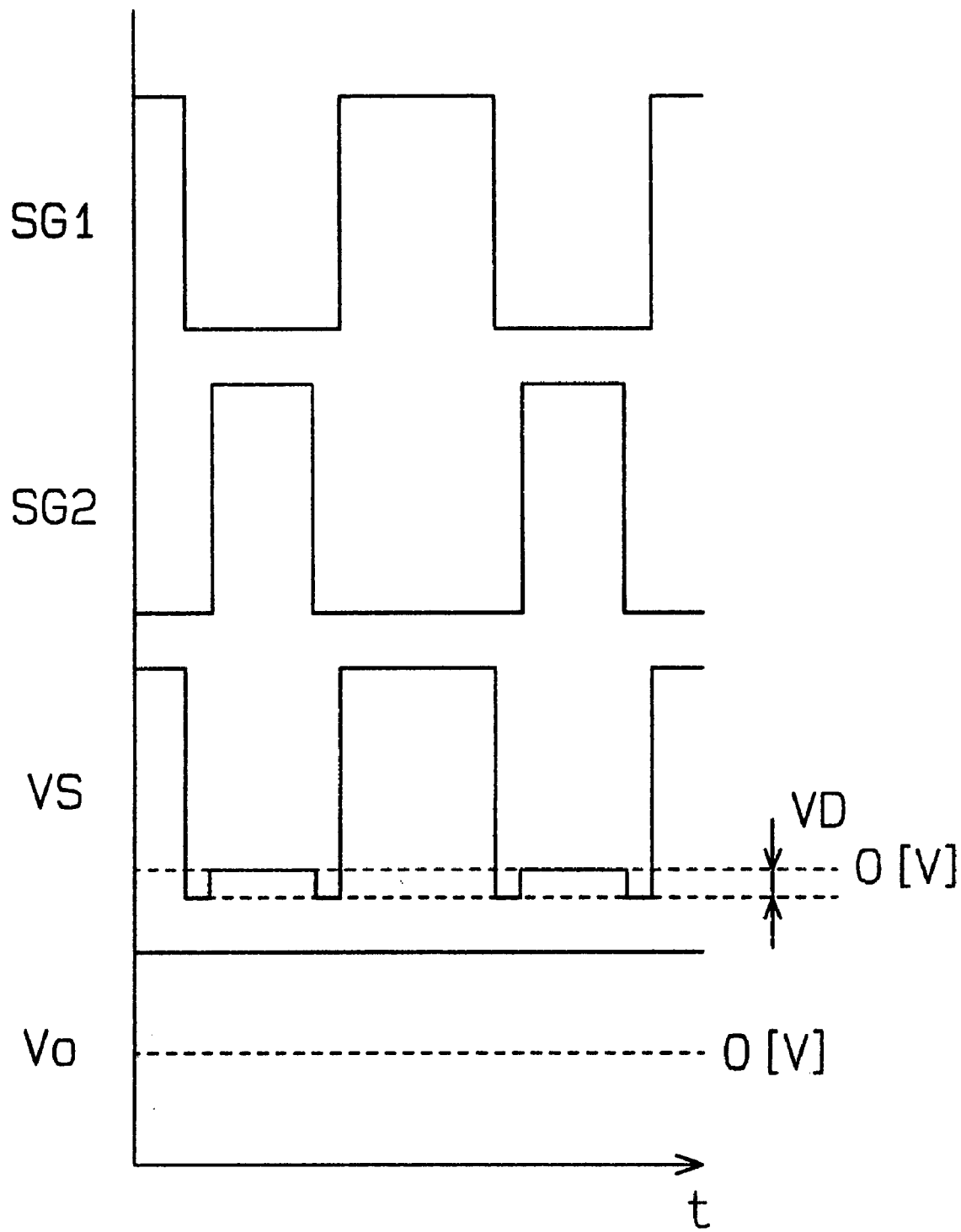
FIG. 2 is a timing chart illustrating the operation of the DC-DC converter of FIG. 1.

In the drawings, like numerals are used for like elements throughout.

Figure 3:
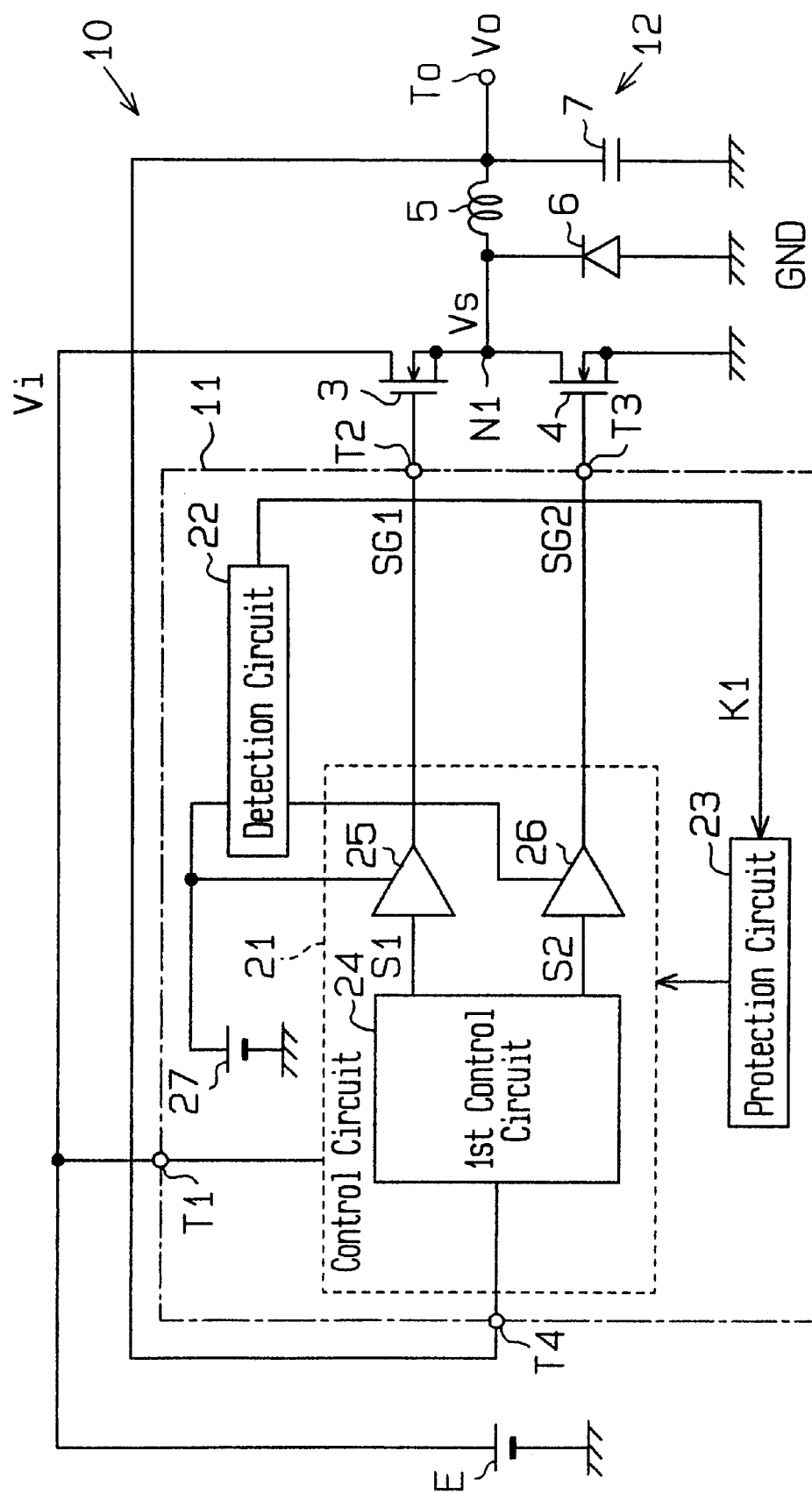
FIG. 3 is a schematic circuit diagram of a DC-DC converter according to a first embodiment of the present invention.

FIG. 3 is a schematic circuit diagram of a DC-DC converter 10 according to a first embodiment of the present invention. The DC-DC converter 10 includes a semiconductor integrated circuit device (controller) 11, which is formed on a semiconductor substrate, a main switching device 3, a synchronous switching device 4, a choke coil 5, a flyback diode 6, and a smoothing capacitor 7.

The controller 11 has four terminals T1–T4. The first input terminal T1 is connected to a battery E to provide the battery voltage Vi to the controller 11. The first output terminal T2 is connected to the gate of the main switching device 3, which is preferably an n-channel MOS transistor. The second output terminal T3 is connected to the gate of the synchronous switching device 4, which is preferably an n-channel MOS transistor. The second input terminal T4 is connected to an output terminal To of the DC-DC converter 10 to return an output voltage Vo from the output terminal To to the controller 11.

The main switching device 3 and the synchronous switching device 4 are connected in series. The drain of the main switching device 3 is provided with a power source voltage Vi of the battery E. The source of the main switching device 3 is connected to the drain of the synchronous switching device 4 at a node N1. The source of the synchronous switching device 4 is connected to the ground GND.

The node N1 between the switching devices 3, 4 is connected to the output terminal To via a smoothing circuit 12, which is formed by the choke coil 5 and the smoothing capacitor 7. The node N1 is connected to the cathode of the flyback diode 6.

The controller 11 includes a control circuit (drive control circuit) 21, a detection circuit 22, and a protection circuit 23. The control circuit 21 has a first control circuit 24 and drive circuits 25, 26. The first control circuit 24 is connected to the second input terminal T4 and generates pulse signals S1, S2 having a duty ratio corresponding to the output voltage Vo supplied via the terminal T4.

The drive circuits 25, 26, which are preferably CMOS drive circuits, are supplied with current from a DC power source 27 via their power source terminals to generate first and second drive signals SG1, SG2 from the pulse signals S1, S2, respectively. The drive circuits 25, 26 provide their drive signals SG1, SG2 to the gates of the switching devices 3, 4, respectively. The first and second drive signals SG1, SG2 activate and deactivate the associated switching devices 3, 4. The DC power source 27 is functionally shown in FIG. 3 as a drive power source of the drive circuits 25, 26, but does not have to be arranged independently in the controller 11. For example, the power source terminals of the drive circuits 25, 25 may be connected to the first input terminal T1 and be operated by supplying power from the battery E.

The detection circuit 22 detects the occurrence of a short circuit (malfunction) between the gate and source of the synchronous switching device 4 and provides the protection circuit 23 with a detection signal K1, which corresponds to the detection result. When the synchronous switching device 4 is short-circuited, the protection circuit 23 responds to the detection signal K1 and stops activating and deactivating the two switching devices 3, 4 to protect the externally connected devices.

The first embodiment employs an n-channel MOS transistor as the synchronous switching device 4. Thus, the detection circuit 22 detects the occurrence of a short circuit between the gate and source of the transistor and generates the detection signal K1 in accordance with the detection result.

The detection circuit 22 monitors the current from the DC power source 27 flowing through the drive circuit (second drive circuit) 26. When a short-circuit occurs between the gate and source of the synchronous switching transistor 4, the output terminal of the drive circuit 26 is connected to the ground GND. Thus, when the drive signal SG2 generated by the CMOS configuration drive circuit 26 goes high, the amount of current flowing from the power source terminal of the drive circuit 26 to the output terminal becomes greater than that during a normal state. When the detection circuit 22 detects a power source current that is greater than that during a normal state, the detection circuit 22 provides the protection circuit 23 with the detection signal K1 indicating the occurrence of a short-circuit.

In response to the detection signal K1, the protection circuit 23 deactivates the switching devices 3, 4. That is, the protection circuit 23 controls the control circuit 21 so that the drive signals SG1, SG2 are maintained at a low level.

Such control sets the output voltage Vo at zero volts, prevents overcurrent from flowing through the main switching device 3 and the flyback diode 6, which are externally connected devices, and thus protects the externally connected devices.

Figure 4:
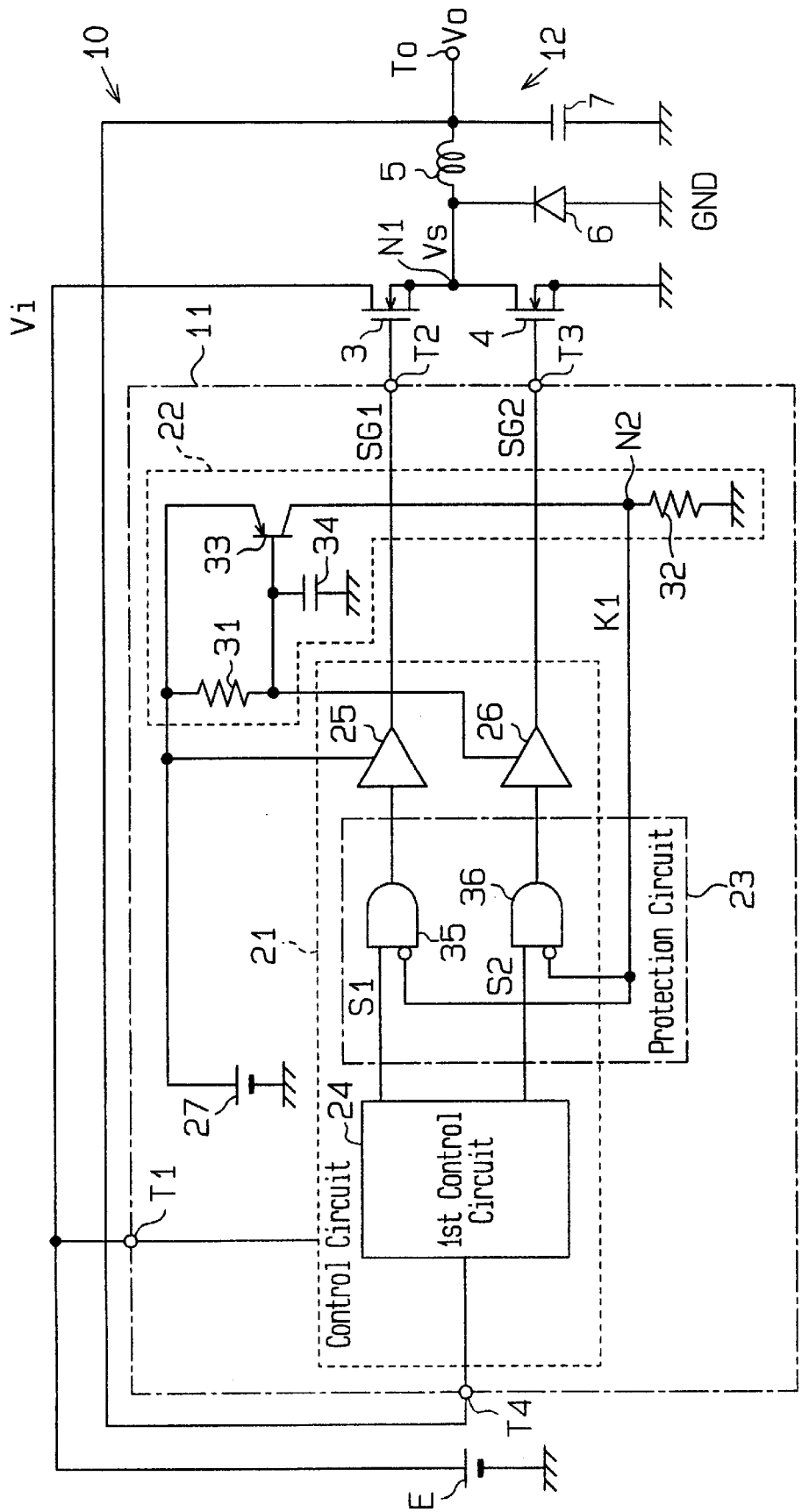
FIG. 4 is a more detailed schematic circuit diagram of the DC-DC converter of FIG. 3.

FIG. 4 is a more detailed schematic circuit diagram of the DC-DC converter 10 showing the detection circuit 22 and the protection circuit 23.

The detection circuit 22 includes resistors 31, 32, a PNP transistor 33, and a capacitor 34. The resistor 31 is connected between the drive circuit 26 and the DC power source 27. The resistor 31 has a first terminal connected to the emitter of the transistor 33 and a second terminal connected to the base of the transistor 33. The transistor 33 has a collector connected to the ground GND via the resistor 32. The base of the transistor 33 is connected to the ground GND via the capacitor 34. A node N2 between the transistor 33 and the resistor 32 is connected to the protection circuit 23.

The transistor 33 of the detection circuit 22 is deactivated when the synchronous switching device 4 is operating normally. Thus, the voltage level at the node N2 is low, and the generated detection signal K1 is low. On the other hand, when the synchronous switching device 4 is short circuited, a large drive current flows through the drive circuit 26 and activates the transistor 33. Thus, the voltage level at the node N2 becomes high, and the detection signal K1 goes high.

The protection circuit 23 includes two (2) two-input type AND circuits 35, 36 connected to the input terminals of the drive circuits 25, 26, respectively. The first input terminals of the AND circuits 35, 36 are respectively provided with the pulse signals S1, S2 from the first control circuit 24. The second input terminals (inverting input terminals) of the AND circuits 35, 36 are each provided with the detection signal K1. Accordingly, in response to the low detection signal K1, the two AND circuits 35, 36 provide the pulse signals S1, S2 to the drive circuits 25, 26, respectively. In response to the high detection signal K1, the AND circuits 35, 36 provide low signals to the drive circuits 25, 26, respectively. That is, the drive signals SG1, SG2 generated by the drive circuits 25, 26 go low when the synchronous switching device 4 is short-circuited. This stops the switching operation of the main switching device 3.

The controller 11 of the DC-DC converter 10 of the first embodiment has the advantages described below.

(1) The controller 11 includes the detection circuit 22, which detects short-circuiting of the synchronous switching device 4, and the protection circuit 23, which deactivates the main switching device 3 and the synchronous switching device 4 in response to the detection signal K1 from the detection circuit 22. As a result, when a short-circuit occurs in the synchronous switching device 4, an overcurrent does not flow through the externally connected devices, such as the main switching device 3 and the flyback diode 6.

(2) The power source current flowing through the drive circuit 26 enables the detection circuit 22 to output the detection signal K1. This facilitates detection of a short-circuit in the synchronous switching device 4.

(3) The detection circuit 22 and the protection circuit 23 are formed on the same semiconductor substrate as the control circuit 21. Thus, the number of externally connected devices is the same as the prior art. This facilitates replacement of the conventional semiconductor integrated circuit with the semiconductor integrated circuit device (controller) 11 of the first embodiment.

It should be apparent to those skilled in the art that the present invention may be embodied in many other specific forms without departing from the spirit or scope of the invention. Particularly, it should be understood that the present invention may be embodied in the following forms.

Figure 5:
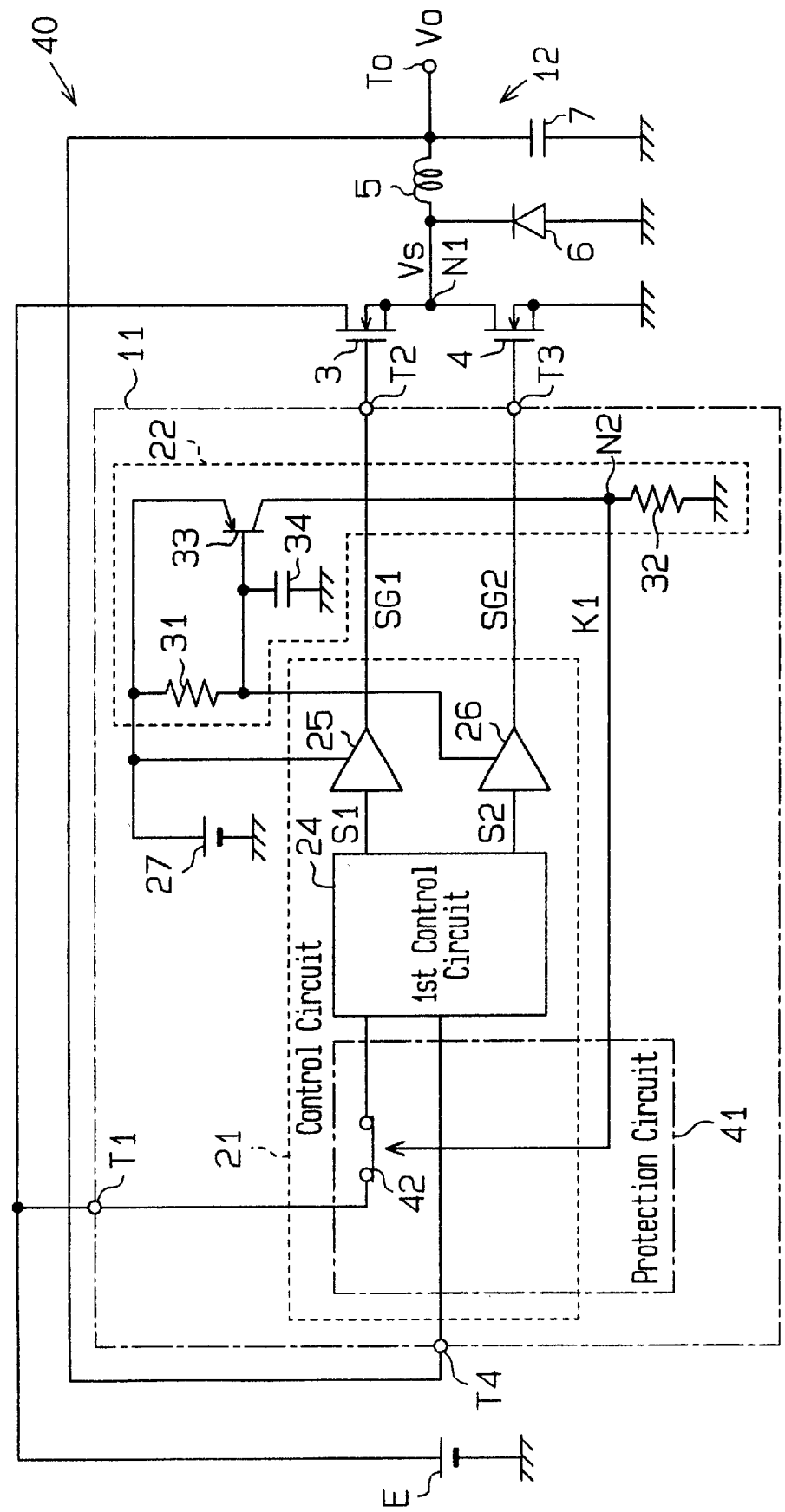
FIG. 5 is a schematic circuit diagram of a DC-DC converter according to a second embodiment of the present invention.

The protection circuit for deactivating the switching devices 3, 4 is not limited to the protection circuit 23 of the first embodiment. For example, referring to FIG. 5, a protection circuit 41 having a switch 42 that goes on and off in response to the detection signal K may be used. The switch 42 is connected between the first control circuit 24 and the first input terminal T1. When the switch 42 goes off, the first control circuit 24 is not provided with the power source voltage. This stops the operation of the first control circuit 24 and causes the pulse signals S1, S2 to go low. In this state, the input levels of the drive circuits 25, 26 are low. Accordingly, the drive signals SG1, SG2 provided to the switching devices 3, 4 are low. This deactivates the switching devices 3, 4.

Figure 6:
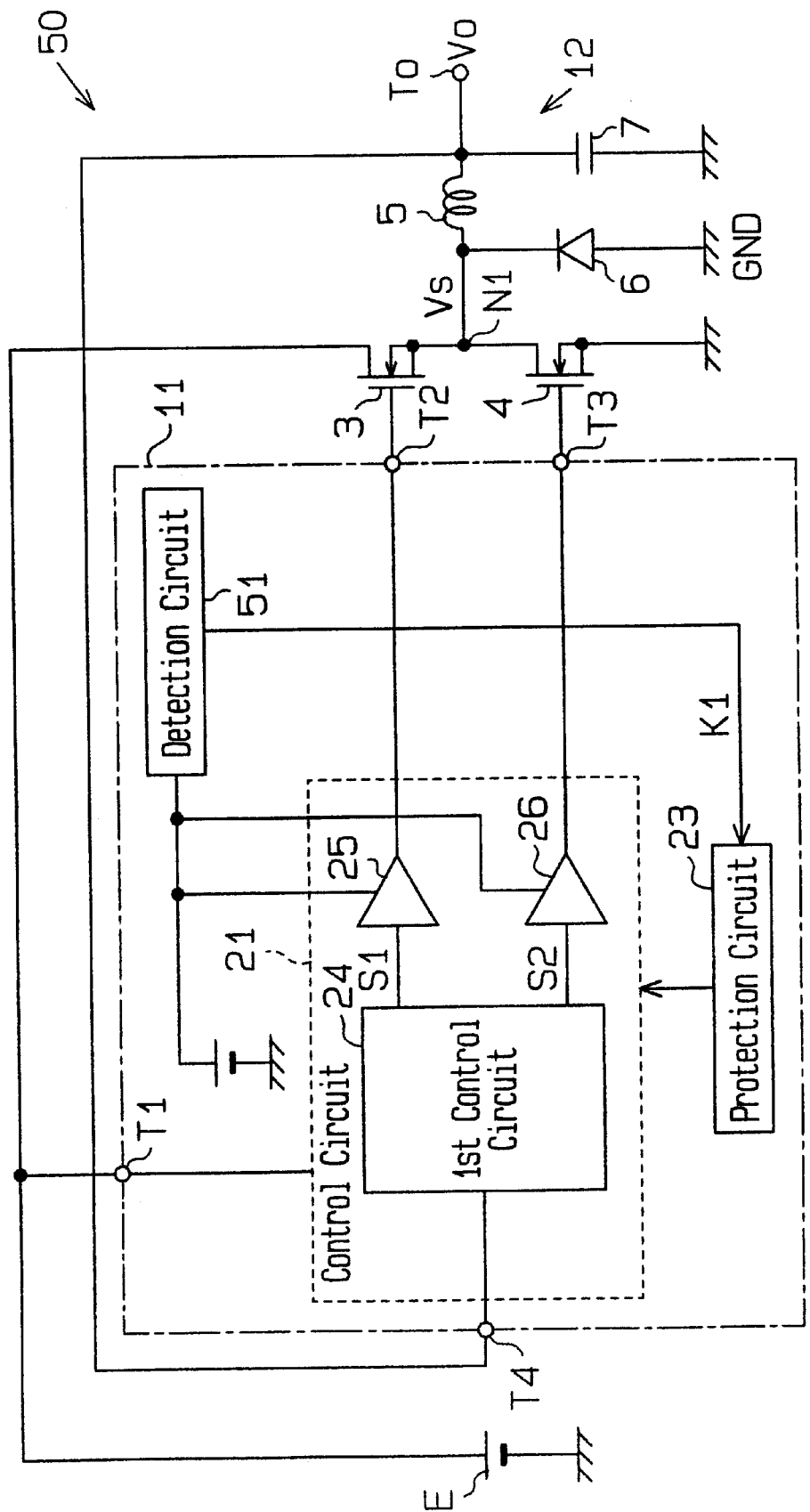
FIG. 6 is a schematic circuit diagram of a DC-DC converter according to a third embodiment of the present invention.

The detection circuit for detecting short-circuiting of the synchronous switching device 4 is not limited to the detection circuit 22 of the first embodiment. For example, referring to FIG. 6, the power source voltage of the drive circuit 26 may be monitored by a detection circuit 51, which generates the detection signal K1 in accordance with the monitoring result. When the synchronous switching device 4 is short-circuited between the gate and source, a large amount of current flows through the drive circuit 26 and decreases the power supply voltage of the drive circuit 26. The detection circuit 51 detects the decrease in the power supply voltage.

Figure 7:
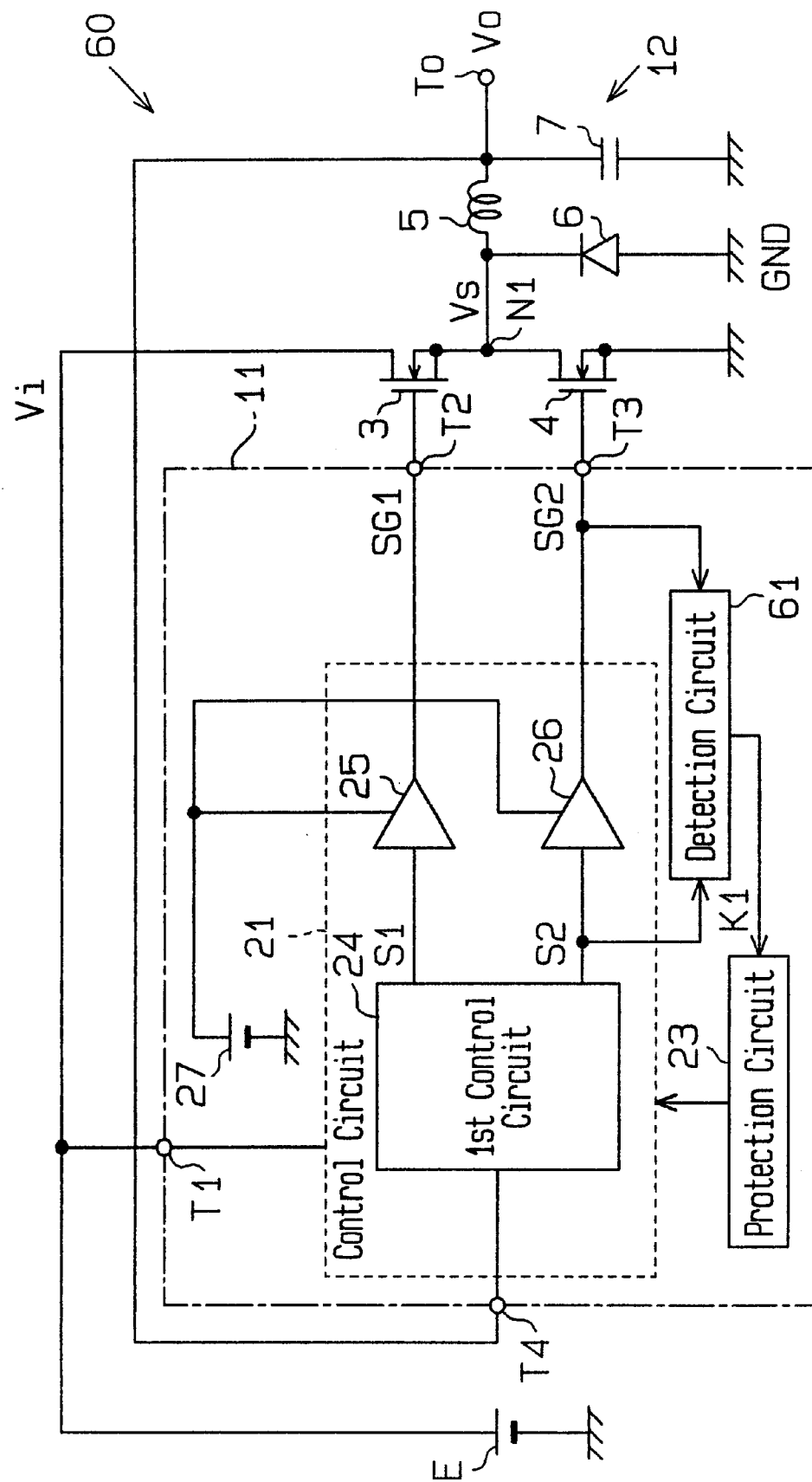
FIG. 7 is a schematic circuit diagram of a DC-DC converter according to a fourth embodiment of the present invention.

Further, as shown in FIG. 7, the input signal S2 and the output signal (drive signal SG2) of the drive circuit 26 may be monitored by a detection circuit 61. The detection circuit 61 compares the input signal S2 with the drive signal SG2 and provides the protection circuit 23 with the detection signal K1 in accordance with the comparison result. When the switching device 4 is short-circuited, the drive signal SG2 always goes low. However, the first control circuit 24 generates the pulse input signal S2 to control activation and deactivation of the synchronous switching device 4. Accordingly, the levels of the input signal S2 and the drive signal SG2 do not match. This is detected by the detection circuit 61 as the occurrence of a short-circuit in the switching device 4.

The detection circuits 51, 61 detect short-circuiting of the synchronous switching device 4 so that the externally connected devices can be protected.

The detection circuits 22, 51, 61 may be externally connected to the semiconductor integrated circuit device 11. In this case, the detection signal K1 is provided from outside the device 11.

The present invention may be applied to a DC-DC converter that employs a p-channel MOS transistor as at least one of the switching devices 3, 4. In this case, the detection circuit 22 of FIG. 4 detects the power source current at the ground GND side.

The present examples and embodiments are to be considered as illustrative and not restrictive, and the invention is not to be limited to the details given herein, but may be modified within the scope and equivalence of the appended claims.

What is claimed is:

1. A controller for controlling a DC-DC converter, wherein the DC-DC converter includes a main switching device and a synchronous switching device, which are series-connected, and a flyback diode and a smoothing circuit, which are connected to a node between the switching devices, wherein the controller comprises:
    a drive control circuit for alternately activating and deactivating the main switching device and the synchronous switching device by supplying the main switching device with a first drive signal and the synchronous switching device with a second drive signal; and
    a signal control circuit for detecting a malfunction of the synchronous switching device and upon detection of a malfunction, controlling the drive control circuit to inhibit the supply of the first and second drive signals.

2. The controller according to claim 1, wherein the signal control circuit includes:
    a detection circuit for detecting the malfunction of the synchronous switching device and generating a detection signal corresponding to the detection result; and
    a protection circuit, connected to the detection circuit, for inhibiting the supply of the first and second drive signals in accordance with the detection signal.

3. The controller according to claim 2, wherein the synchronous switching device includes a plurality of terminals, and the detection circuit detects short-circuits between the terminals of the synchronous switching device.

4. The controller according to claim 3, wherein the controller is formed on a single semiconductor substrate.

5. The controller according to claim 2, wherein the drive control circuit includes a first drive circuit for supplying the main switching device with the first drive signal and a second drive circuit for supplying the synchronous switching device with the second drive signal, and the detection circuit monitors a power source current of the second drive circuit to detect the malfunction and generate the detection signal.

6. The controller according to claim 5, wherein the controller is formed on a single semiconductor substrate.

7. The controller according to claim 2, wherein the drive control circuit includes a first drive circuit for supplying the main switching device with the first drive signal and a second drive circuit for supplying the synchronous switching device with the second drive signal, and the detection circuit monitors a power source voltage supplied to the second drive circuit to detect the malfunction and generate the detection signal.

8. The controller according to claim 7, wherein the controller is formed on a single semiconductor substrate.

9. The controller according to claim 2, wherein the drive control circuit includes a first drive circuit for supplying the main switching device with the first drive signal and a second drive circuit for supplying the synchronous switching device with the second drive signal, and the detection circuit compares an input signal of the second drive circuit with an output signal of the second drive circuit to detect the malfunction and generate the detection signal.

10. The controller according to claim 9, wherein the controller is formed on a single semiconductor substrate.

11. The controller according to claim 2, wherein the drive control circuit includes a first drive circuit for supplying the main switching device with the first drive signal and a second drive circuit for supplying the synchronous switching device with the second drive signal, and the protection circuit provides the first and second drive circuits with an inhibit signal having a predetermined level to deactivate the main switching device and the synchronous switching device.

12. The controller according to claim 11, wherein the controller is formed on a single semiconductor substrate.

13. The controller according to claim 2, wherein the protection circuit includes a switch connected between a drive power source of the drive control circuit and the drive control circuit to disconnect the drive control circuit from the drive power source in response to the detection signal.

14. The controller according to claim 13, wherein the controller is formed on a single semiconductor substrate.

15. A controller for a DC-DC converter, wherein the DC-DC converter includes a main switching device and a synchronous switching connected in series between a power supply and a ground, the controller comprising:
    a drive control circuit for supplying a first drive signal to the main switching device and a second drive signal to the synchronous switching device to alternately activate and deactivate the main switching device and the synchronous switching device;
    a detection circuit connected to the synchronous switching device for detecting a malfunction thereof and generating a detection signal; and
    a protection circuit, connected to the detection circuit and the drive control circuit, for inhibiting the first and second drive signals in response to the detection signal, wherein the controller is formed on a single semiconductor substrate.

16. The controller according to claim 15, wherein the drive control circuit includes a first drive circuit for supplying the main switching device with the first drive signal and a second drive circuit for supplying the synchronous switching device with the second drive signal, and wherein the detection circuit includes:
    a first resistor;
    a second resistor;
    a transistor having a first terminal connected to a power source, a second terminal connected to a ground by way of the second resistor, and a third terminal connected to the power source by way of the first resistor; and a capacitor connected between the transistor third terminal and the ground, wherein the transistor third terminal is further connected to the second drive circuit, and wherein the detection signal is generated at a node between the transistor and the second resistor.

17. The controller according to claim 16, wherein the protection circuit includes a first and second logic gates for respectively inhibiting the first and second drive signals in accordance with the detection signal.

18. The controller according to claim 16, wherein the protection circuit includes a switch connected between the drive control circuit and the power supply, wherein the switch is opened in response to the detection signal, thereby disconnecting the drive control circuit from the power supply such that the drive control circuit does not generate the first and second drive control signals.

19. A DC-DC converter comprising:

a main switching device;

a synchronous switching device connected in series with the main switching device;

a flyback diode connected to a node between the two switching devices;

a smoothing circuit connected to a node between the two switching devices; and a controller connected to the main switching device and the synchronous switching device, wherein the controller includes, a drive control circuit for alternately activating and deactivating the main switching device and the synchronous switching device by supplying the main switching device with a first drive signal and the synchronous switching device with a second drive signal; and a signal control circuit for detecting a malfunction of the synchronous switching device and upon detection of the malfunction, controlling the drive control circuit to inhibit the supply of the first and second drive signals.

* * * * *

UNITED STATES PATENT AND TRADEMARK OFFICE
CERTIFICATE OF CORRECTION

PATENT NO.   : 6,320,359 B1
DATED        : November 20, 2001
INVENTOR(S)  : Yoshihiro Nagaya et al.

It is certified that error appears in the above-identified patent and that said Letters Patent is hereby corrected as shown below:

<u>Title page,</u>
Please change the following:
[30], Foreign Application Priority Data
  "Feb. 24, 2000 (JP) ......................................................... 12-047680"

to

-- Feb. 24, 2000 (JP) ......................................................... 2000-047680 --

Signed and Sealed this

Thirtieth Day of April, 2002

Attest:

Attesting Officer

JAMES E. ROGAN
*Director of the United States Patent and Trademark Office*